US007689396B2

(12) United States Patent
Campbell (10) Patent No.: US 7,689,396 B2
(45) Date of Patent: Mar. 30, 2010

(54) TARGETED GEOPHYSICAL SURVEY

(75) Inventor: Steven Blake Campbell, Houston, TX (US)

(73) Assignee: PGS Americas, Inc., Houston, TX (US)

( * ) Notice: Subject to any disclaimer, the term of this patent is extended or adjusted under 35 U.S.C. 154(b) by 2041 days.

(21) Appl. No.: 10/155,158

(22) Filed: May 24, 2002

(65) Prior Publication Data

US 2003/0220745 A1 Nov. 27, 2003

(51) Int. Cl.
*G06G 7/50* (2006.01)

(52) U.S. Cl. .......................................... 703/10
(58) Field of Classification Search .................. 703/10; 367/73, 86, 88
See application file for complete search history.

(56) References Cited

U.S. PATENT DOCUMENTS 5,905,657 A * 5/1999 Celniker ........................ 703/5
6,965,849 B1 * 11/2005 Cao et al. ..................... 703/10

FOREIGN PATENT DOCUMENTS

WO WO 01/59483 8/2001

OTHER PUBLICATIONS

C. Peter Ashton et al., 3D Seismic Survey Design, Apr. 1994, Oilfield Review, pp. 19-32, obtained from www.slb.com/media/services/resources/oilfieldreview/ors94/0494/p19_32.pdf, on Nov. 22, 2005.*

* cited by examiner

*Primary Examiner*—Paul L Rodriguez
*Assistant Examiner*—Luke Osborne
(74) *Attorney, Agent, or Firm*—E. Eugene Thigpen; Richard A. Fagin (57) ABSTRACT

In one embodiment the invention comprises a system for planning a seismic survey based on a model of a subsurface formation in which a computer simulation is generated having sources and receivers positioned in selected locations with respect to the model. Ray tracing is performed from the sources to estimate a propagation ray path of seismic signals emanating from the source locations, and emergent points are determined at which ray paths reach the earth's surface following reflection from a subsurface area of interest. A survey may then be designed and performed in which receiver positions are concentrated at the areas where the emergent points are concentrated.

6 Claims, 11 Drawing Sheets

TARGETED GEOPHYSICAL SURVEY

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

1. Field of the Invention

The invention relates generally to the field of seismic surveying. More particularly, the invention relates to methods for planning and performing seismic surveys.

2. Background Art

Seismic surveying is known in the art for determining structures of rock formations below the earth's surface. Seismic surveys are performed by generating seismic signals at source locations and receiving the resulting seismic signals at receiver locations. The seismic signal emanates from the source, and spreads outwardly in a substantially spherical pattern. When the signal reaches interfaces in the subsurface between strata having different acoustic velocities (and also different acoustic impedances), a portion of the energy will be reflected from the interface, and a portion of the energy will be transmitted through the interface. For the reflected energy the raypath follows the rule that the angle of incidence is equal to the angle of reflection. The raypath of the energy traveling through the interface will be altered according to Snell's Law.

If the earth's surface and all reflecting interfaces in the subsurface are substantially flat and parallel to the earth's surface, then for seismic signals generated at a given source location and detected at a given receiver location, it can be assumed that the reflection locations will be directly below the mid-point between the source location and the receiver location. Accordingly, if seismic signals are generated at an evenly spaced pattern of source locations, such as a rectangular grid of locations having uniform spacing of the source locations in the in-line direction and in the cross-line direction, and if the receiver locations are also evenly spaced, the locations at which the resulting seismic signals are reflected from a given subsurface reflecting interface will also be evenly spaced, and the reflecting interface will be uniformly illuminated. As used herein the term "illumination" refers to the quantity of signals reflected from a designated area of a subsurface reflecting interface and detected by the receivers.

Frequently, subsurface structures that are of interest to the explorationist are neither parallel to the earth's surface nor flat. Because of the irregularities in the structure of this body, the seismic raypaths emanating from the surface seismic sources that travel to this body and are then reflected to the earth's surface will reach the earth's surface in a very irregular pattern, so that the signals received by the receivers positioned in a standard regular grid pattern as described above represent an illumination of the body which has substantial variation from one part of the structure to another.

For areas of low illumination, the "fold", i.e., the number of received seismic data traces representative of the areas of low illumination may be inadequate to satisfactorily map such locations. Accordingly, it is an object of this invention to structure a seismic survey that enhances the illumination of subsurface areas of interest that would otherwise have low illumination.

SUMMARY OF INVENTION

In one embodiment the invention comprises a system for planning a seismic survey based on a model of a subsurface formation in which a computer simulation is generated having sources and receivers positioned in selected locations with respect to the model. Ray tracing is performed from the sources to estimate a propagation ray path of seismic signals emanating from the source locations, and emergent points are determined at which ray paths reach the earth's surface following reflection from a subsurface area of interest. A survey may then be designed and performed in which receiver positions are concentrated at the areas where the emergent points are concentrated.

Other aspects and advantages of the invention will be apparent from the following description and the appended claims.

DETAILED DESCRIPTION

Figure 4:
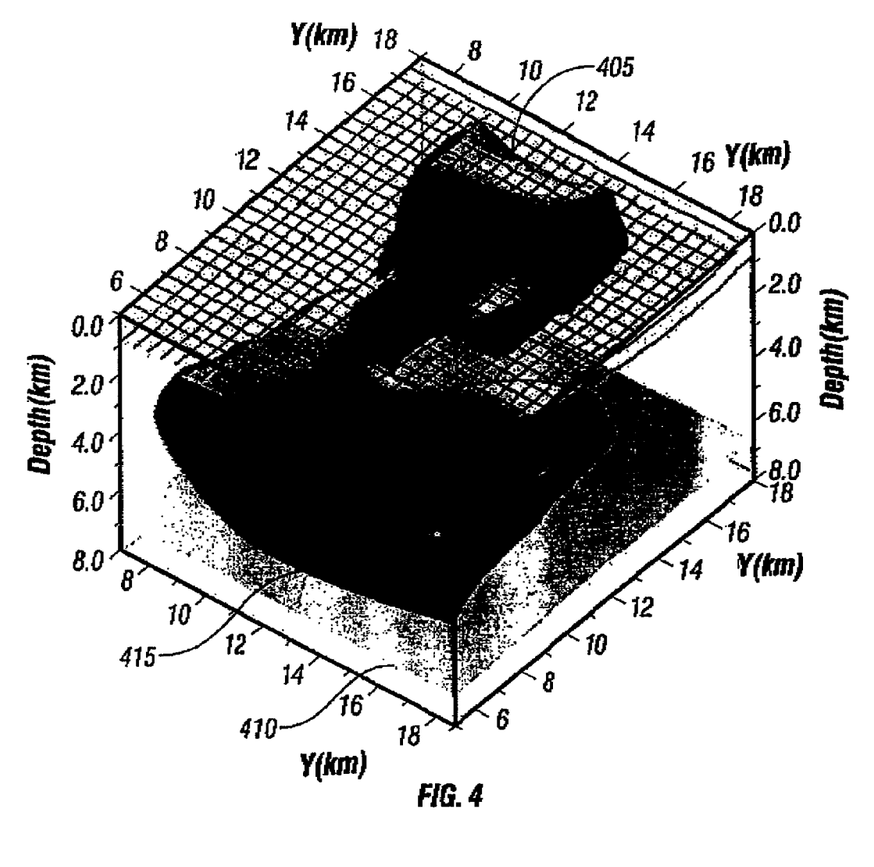
FIG. 4 shows such a model of a target interface.

In practicing the present invention, a model of the subsurface, including a model of a target interface, and a velocity model of the subsurface strata between the earth's surface and the target interface, is utilized. The model shown in FIG. 4 shows such a model of a target interface.

The method of this invention is applicable to surveys in which a first survey may have been performed and resulted in an area of low illumination. The method of this invention is also applicable to processes in which a model of the subsurface has been generated from well log data, gravity data or magnetic data, as well as from a seismic survey, and to models that may have been created from varying combinations of seismic, well log, gravity and/or magnetic data, in which the model shows a subsurface structure that would result in a low illumination of such structure by standard seismic source and receiver placement.

Figure 1:
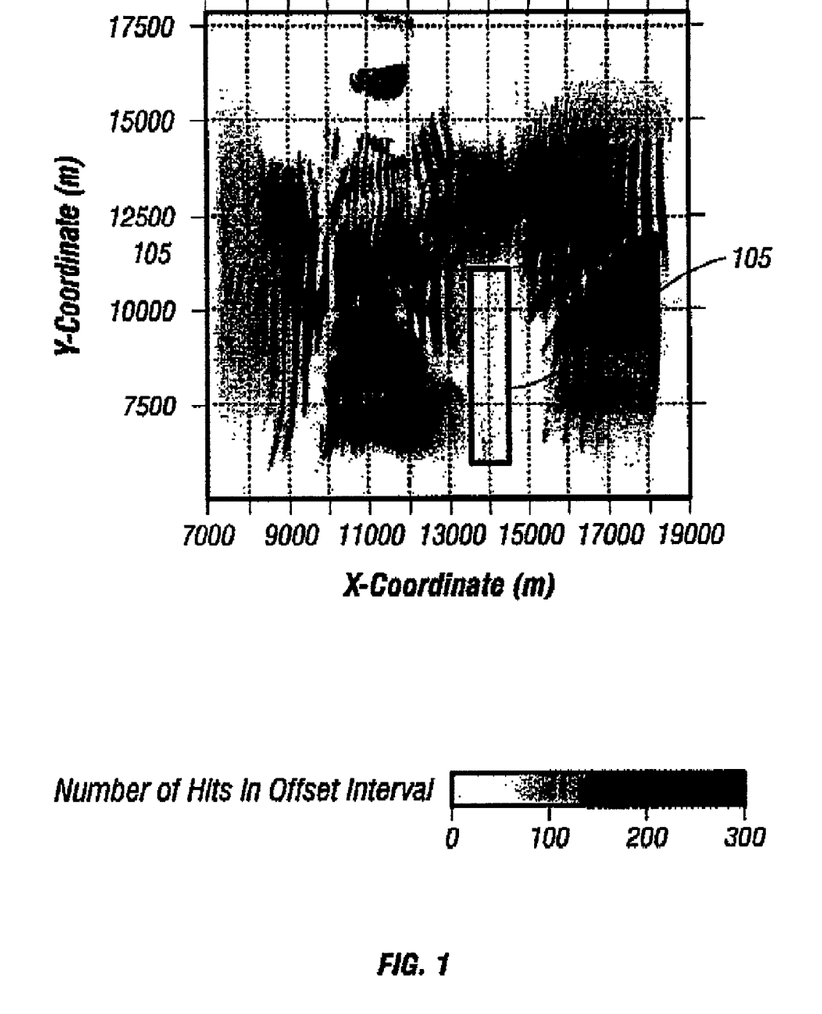
FIG. 1 is a map view of a targeted subsurface horizon showing the illumination of the horizon.

FIG. 1 is a map view of a targeted subsurface horizon showing the illumination of the horizon. The lighter areas are areas of low illumination, and the darker areas are areas of high illumination. Block 105 is drawn around an area of interest that has low illumination. The data for this particular illustration was obtained utilizing marine data, in which both the receivers and the sources were towed behind a vessel. However the invention described herein is equally applicable to other types of surveys, including land surveys and ocean bottom cable surveys.

Figure 2:
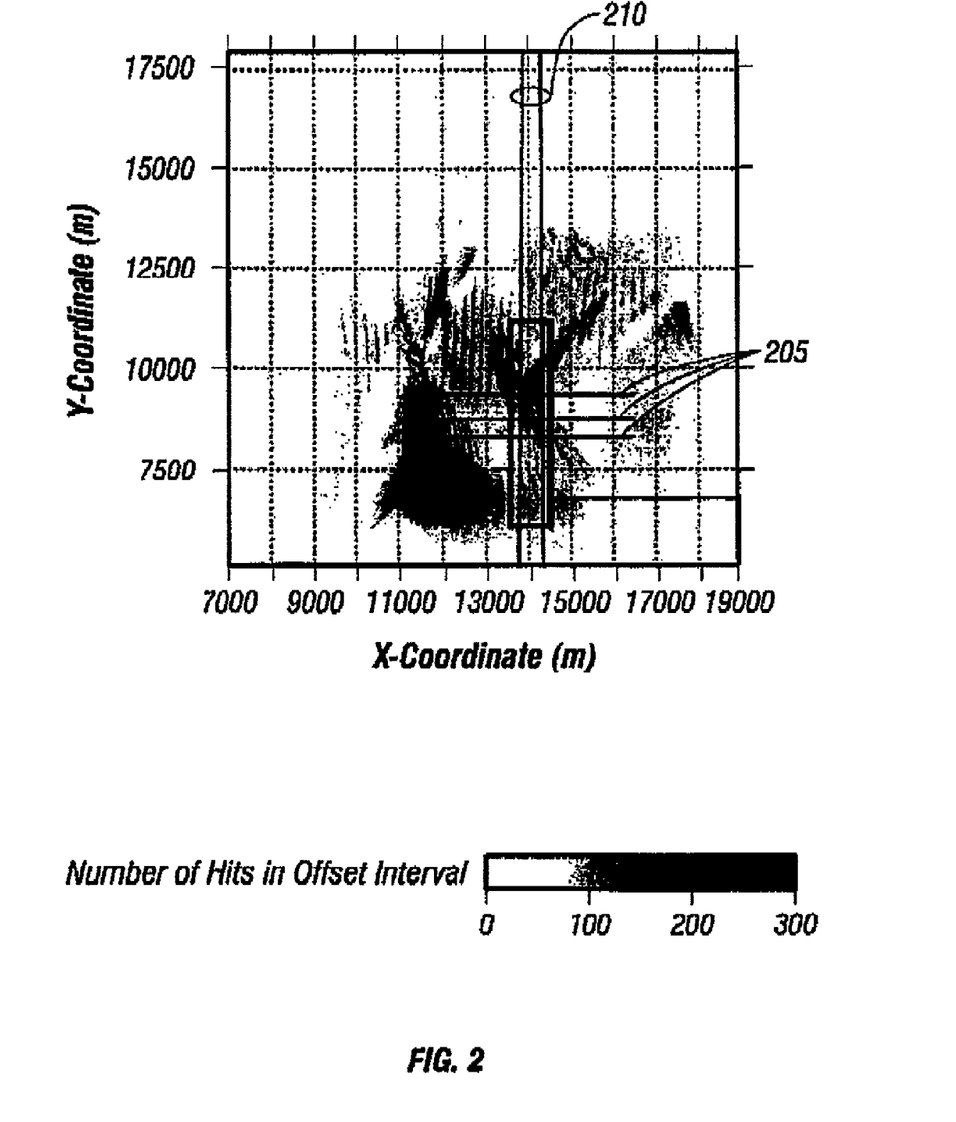
FIG. 2 illustrates a typical method used in marine surveys for attempting to improve the illumination of an area of low illumination.

In the prior art, the standard way of improving the illumination would be to re-shoot part of the survey with sources and/or receivers being concentrated over the area of low illumination. FIG. 2 illustrates a typical method used in marine surveys for attempting to improve the illumination of an area of low illumination, such as area 105. A seismic vessel, towing seismic sources, generates seismic signals along paths 210 extending lengthwise across the area of low illumination. Ocean bottom cables 205 are laid perpendicular to the path of the vessel. FIG. 2 shows three ocean-bottom cables laid in parallel, but the number of cables utilized may vary.

Figure 3:
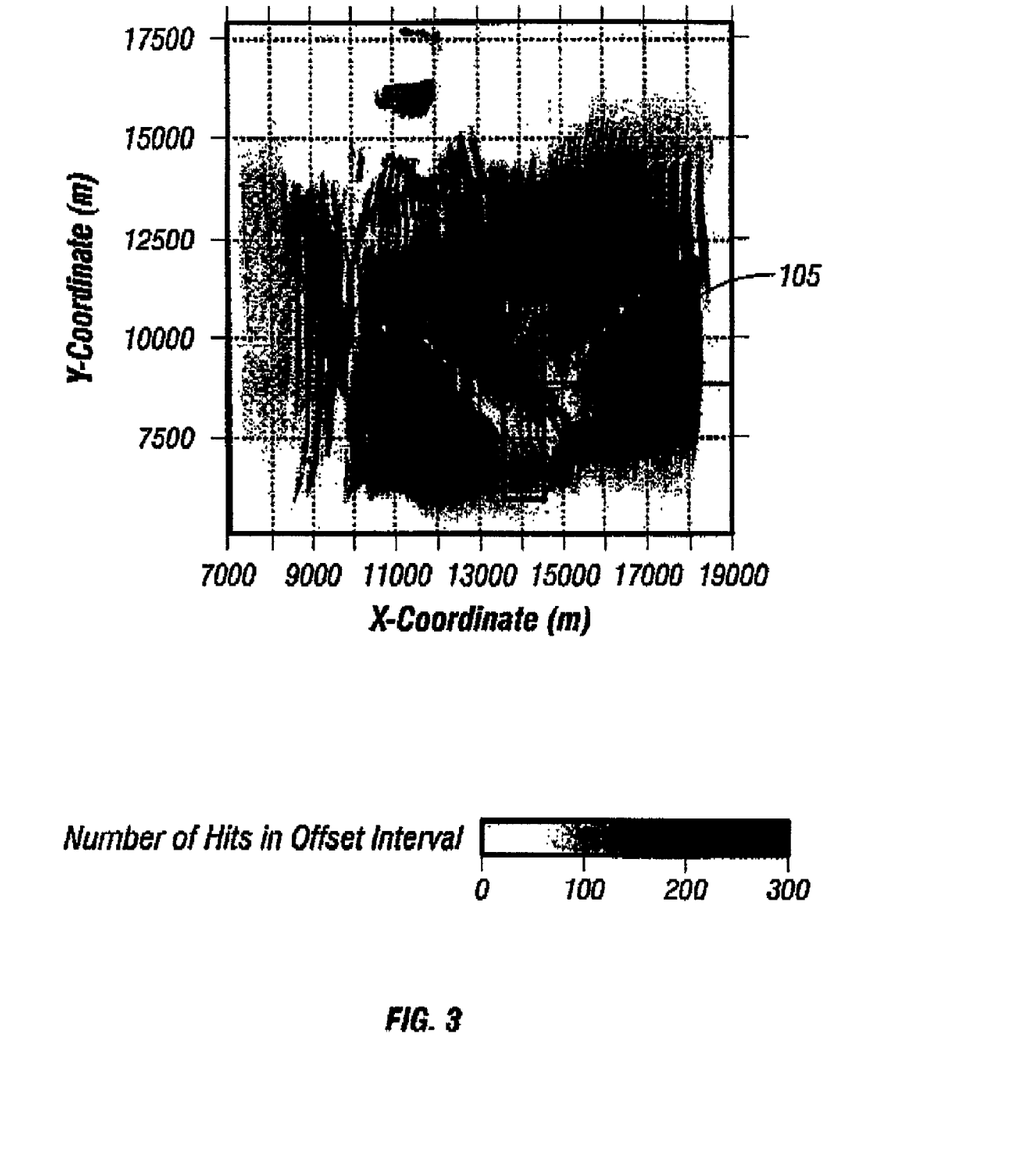
FIG. 3 shows the illumination achieved by combining streamer data depicted in FIG. 1 with a supplemental targeted survey.

The illumination achieved by the supplemental survey depicted in FIG. 2 is also shown in FIG. 2, with dark areas representing areas of high illumination and light areas representing areas of low illumination. FIG. 3 shows the illumination achieved by combining the streamer data depicted in FIG. 1 with the supplemental survey depicted in FIG. 2, again with dark areas representing high illumination and light areas representing low illumination.

Although concentrating receivers and sources in an area of low illumination of interest will typically provide improvement in the illumination of the subsurface area of interest, as is shown by the comparison of FIG. 3 to FIG. 1, the emergent locations at which seismic signals emerge at the earth's surface after being reflected from the subsurface area of interest, may be located at locations where the receivers have not been placed.

In FIG. 4, the subsurface area that it is desired to illuminate is the flat surface 410 beneath the salt. The salt body 405 is shown to demonstrate the reason for the low illumination, which is related to the depression 410 in the salt body.

In accordance with the present invention receivers and/or sources are positioned to enhance areas of low illumination. In an embodiment of the present invention, a computer is utilized to simulate an "everywhere" survey in the region of interest. In an "everywhere" survey, seismic source positions are simulated in a selected pattern, which may be a rectangular grid pattern, with spacings between the source locations sufficiently close that seismic signals emanate essentially from "everywhere" within the area in which the simulated seismic sources are positioned. Similarly, in the computer model, seismic receiver positions are simulated in a selected pattern, which may also be a rectangular grid pattern, with spacings between the receiver locations sufficiently close that seismic signals may be received essentially "everywhere" within the area where the simulated receivers are placed.

Ray tracing is then performed from each seismic source location. In performing ray tracing, propagation paths are calculated for rays emanating from the source location at varying angles. These ray paths will include rays emanating from the source within a cone encompassing an arc, which may be 60 degrees, but may be a different arc selected by the explorationist. The number of rays which are traced is selected by the explorationist, but might typically be thousands of rays from each source location, with the angle between rays typically being substantially uniform. Each ray is traced through the subsurface strata, with the ray path depending on the velocity of the subsurface strata through which the ray passes, until it reaches the target structure, from which the ray will be reflected according to the law that the angle of incidence equals the angle of reflection. The ray is then traced from the reflecting surface back to the earth's surface where the ray emerges at a location referred to herein as the "emergent" point. Each of the rays emanating from a source location which is reflected from the target structure is traced from the source location to the target location and back to the earth's surface. Similarly, rays from each of the other source locations in the simulated survey are traced from the source locations to the target interface and back to the earth's surface.

Figure 5:
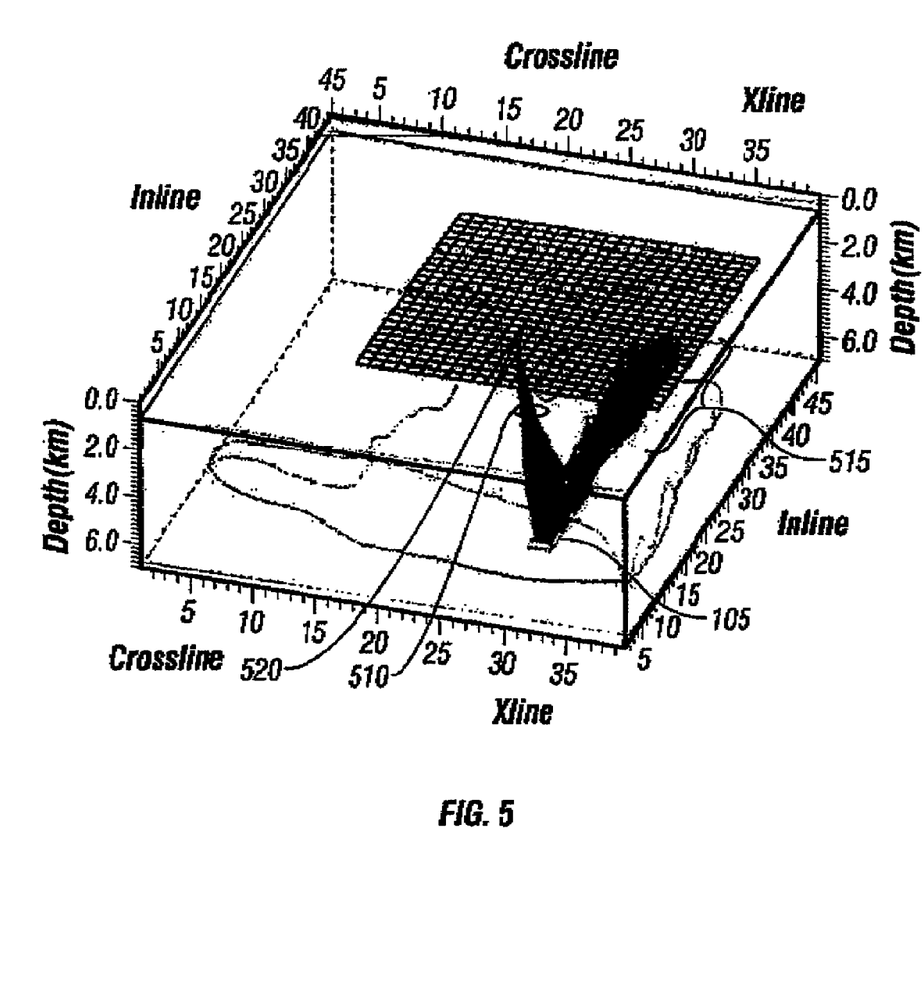
FIG. 5 shows ray tracing from a source location.

This FIG. 5 shows ray tracing from a source location. The rays illustrated are rays 510, emanating from the source location 520 which are reflected from the target area of low illumination 105 in the subsurface, and reach the earth's surface at emergent points in locations 515.

Raypaths are selected having a reflection location within the area of the target reflector having a low illumination in the model, and having an emergent point within a specified distance of the location of a receiver in the simulated survey. The specified distance might be 50 meters, for example. Surface areas having a high concentration of such emergent points are then determined. In one embodiment of the invention these surface areas are mapped into a plurality of bins, which may be square or rectangular, and typically might be squares of 200 meters on each side. The emergent fold (the number of emergent points in each bin) is then determined, and the bins having the greater emergent fold numbers are selected as potential receiver locations for a survey planned according to this invention.

Figure 6:
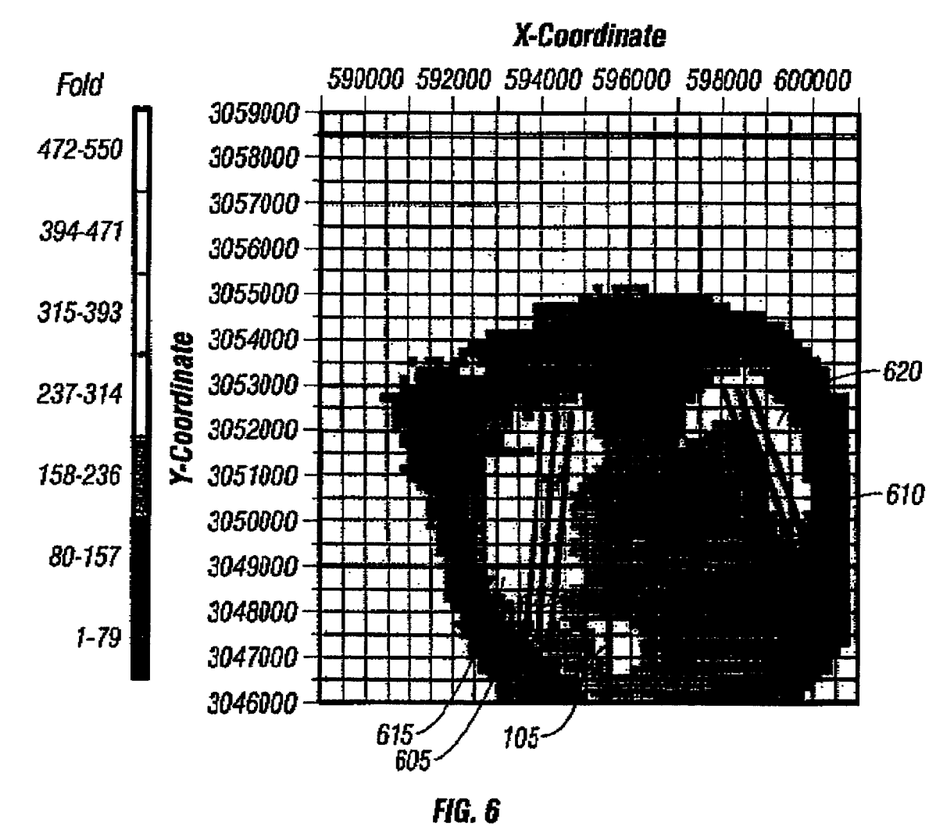
FIG. 6 shows the results of the "everywhere" survey for ray paths reflecting from a target area.

FIG. 6 shows the results of the "everywhere" survey for ray paths reflecting from target area 105. Lighter areas are the areas for which there was a greater concentration of emergent points. Areas having the greatest concentration of emergent points are indicated by numerals 615 and 620. These areas are the locations where receivers might be placed for a targeted survey to improve the illumination of the subsurface area of low illumination. The lines indicated by numerals 605 and 610 are possible locations for ocean bottom cables on which receivers are located.

Figure 7:
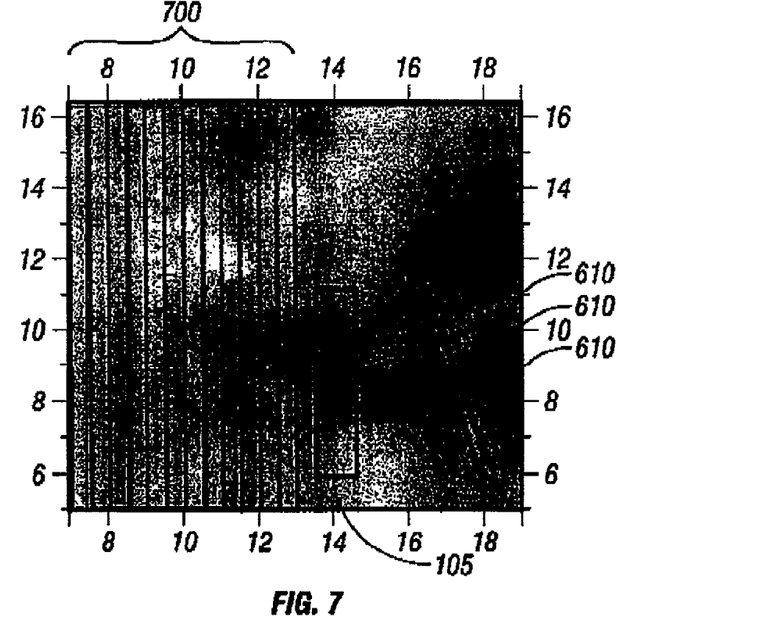
FIG. 7 shows possible travel paths of a vessel towing sources for generating seismic signals for detection by sensor cables positioned according to an embodiment of the invention to achieve the desired illumination of subsurface area of interest.
Figure 8:
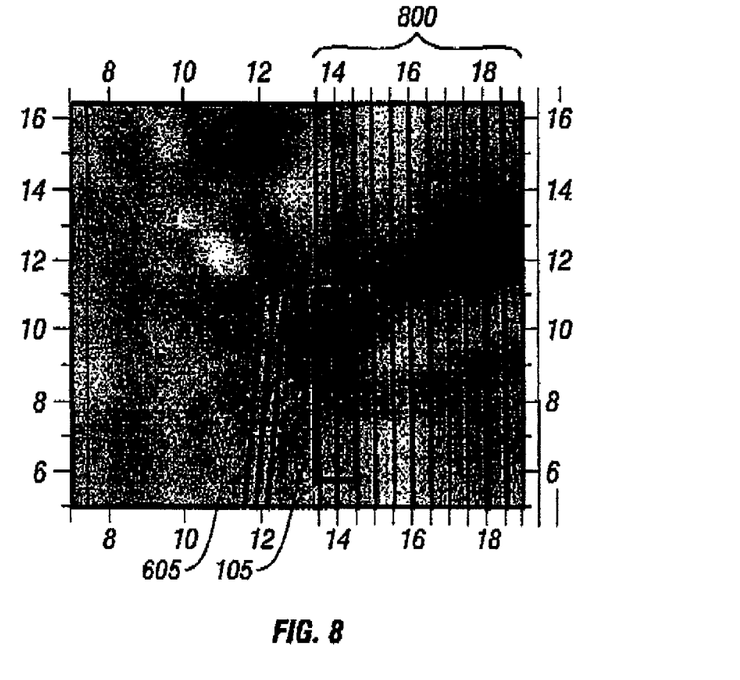
FIG. 8 also shows possible travel paths of a vessel towing sources for generating seismic signals for detection by sensor cables positioned according to an embodiment of the invention to achieve the desired illumination of subsurface area of interest.

In conducting such a targeted survey, it will typically be more economical to lay ocean bottom cables successively at location 605 and location 610. FIG. 7 shows possible travel paths 700 of a vessel towing sources for generating seismic signals for detection by the sensor cables positioned at locations 610, to achieve the desired illumination of area 105. FIG. 8 shows possible travel paths 800 of a vessel towing sources for generating seismic signals for detection by the sensor cables positioned at locations 605, to achieve the desired illumination of area 105.

Figure 9:
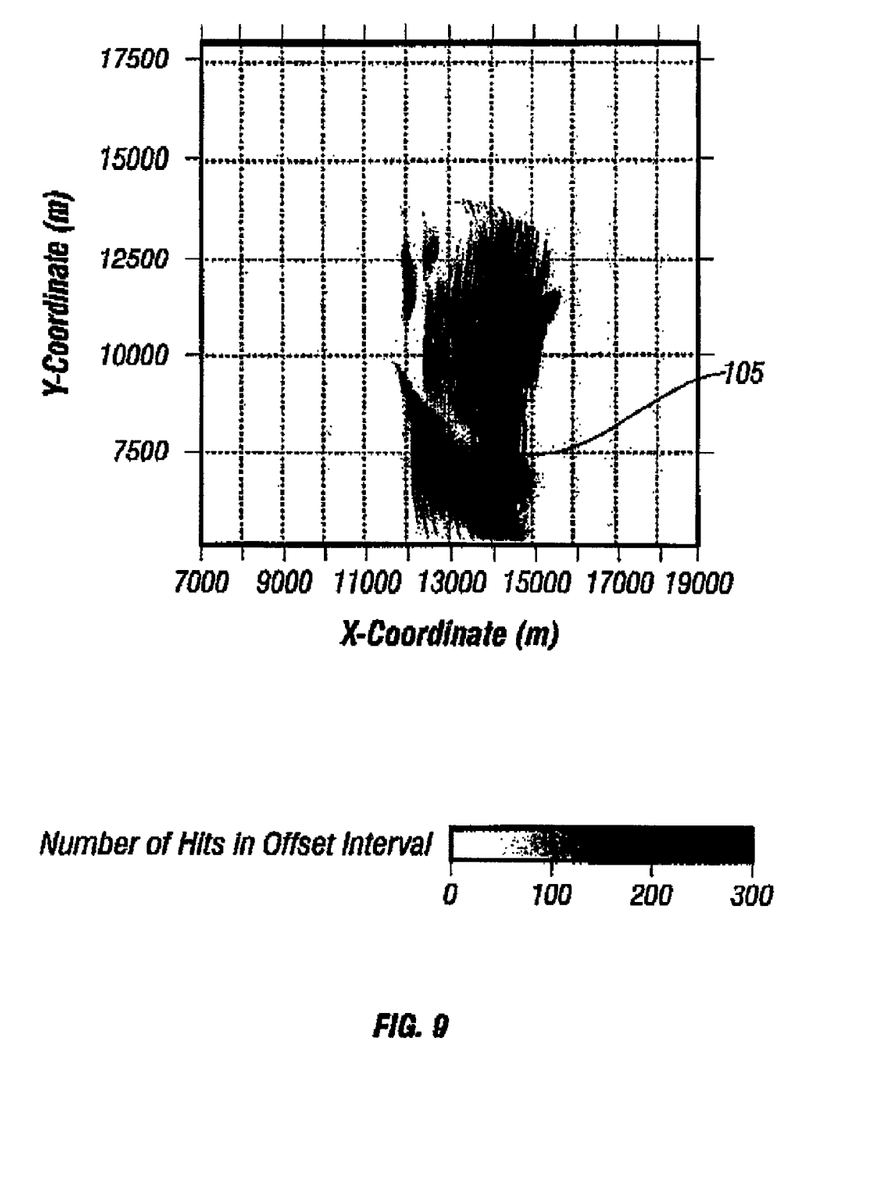
FIG. 9 shows the results of the targeted survey described with reference to FIGS. 6, 7 and 8.
Figure 10:
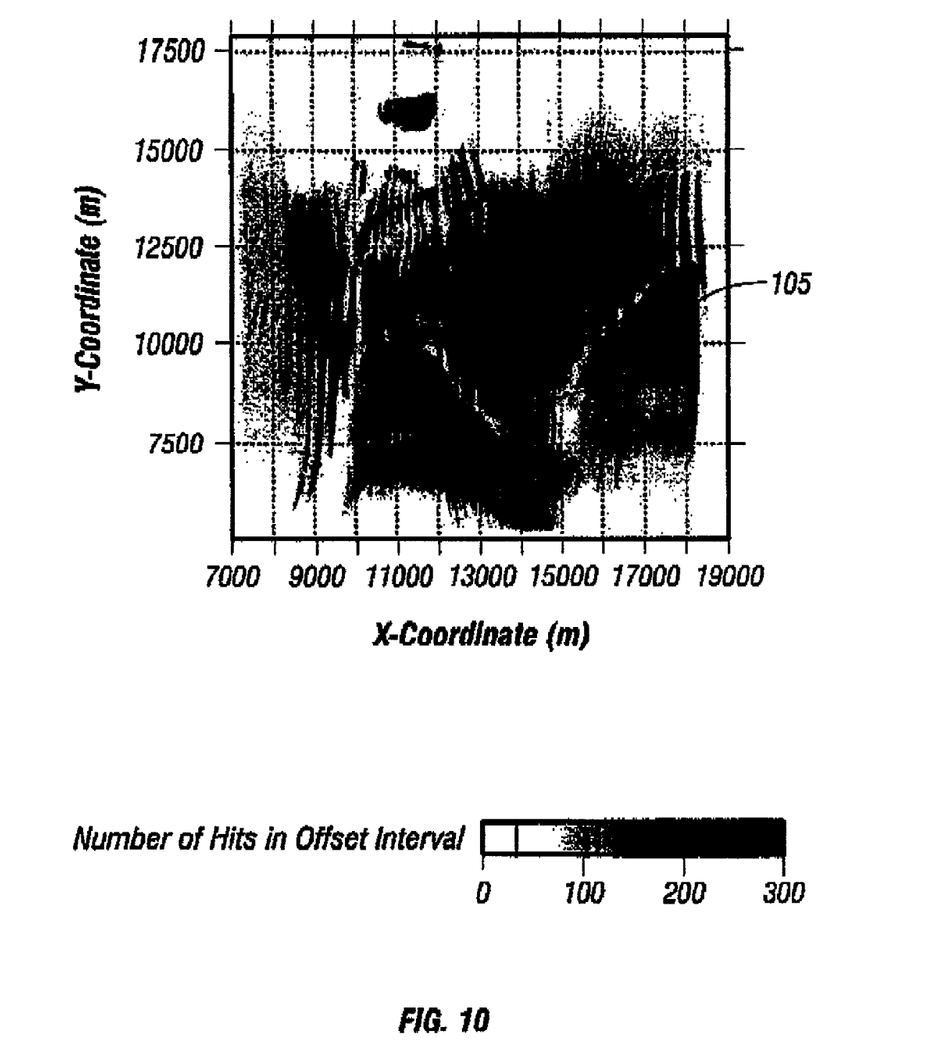
FIG. 10 represents a combination of the streamer survey illustrated in FIG. 1 and the targeted survey shown in FIG. 9.

FIG. 9 shows the results of the targeted survey described with reference to FIGS. 6, 7 and 8, in which the darker areas represent areas of greater illumination. FIG. 10 represents a combination of the streamer survey illustrated in FIG. 1 and the targeted survey shown in FIG. 9. The enhanced illumination of area 105 resulting from the targeted survey is clearly shown.

In another embodiment of the invention, a computer is utilized to trace raypaths in the reverse direction, from the direction illustrated in FIG. 5, to select source locations for a survey planned according to this embodiment of the invention. In performing the reverse raytracing, receiver locations are positioned only within the bins that were determined to have a high concentration of emergent points (a high emergent fold) of ray paths having a reflection from the target area of low illumination. Except that rays are traced only from bins having a high emergent fold, the "everywhere" concept is utilized for the reverse ray tracing in the same manner as for the forward ray tracing. Reverse ray paths are then traced from receiver locations within the selected bins. The angle of the cone for which ray paths are traced and the number of raypaths within the cone may be the same as selected for the ray tracing from the source locations, but may also be different depending on the judgment of the explorationist. The raypaths extending from these receiver locations and having a reflection point within the area of low illumination are followed to the earth's surface. Points at which these raypaths reach the earth's surface, which may be referred to herein as "departure" points, that are within a specified distance from a source location, are selected. This specified distance might be 50 meters, for example. Surface areas having a high concentration of these departure points are determined. As in the forward raytracing, the surface may be mapped into a plurality of bins, which may be square or rectangular, and typically might be squares of 200 meters on each side. The departure fold (the number of departure points in each bin) is then determined, and the bins having the higher departure fold numbers are selected as the areas for placing sources for a survey planned according to this implementation of the invention.

Figure 11:
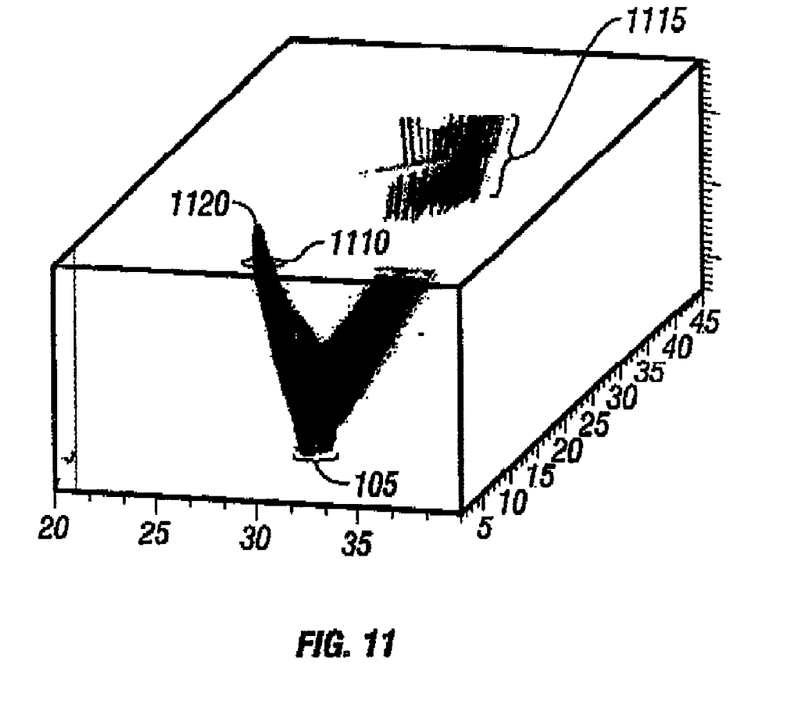
FIG. 11 illustrates the reverse ray tracing in which rays are traced from a receiver location to an area of low illumination and back to the surface.

FIG. 11 illustrates the reverse ray tracing from receiver location 1120. The rays illustrated are rays 1110, extending from receiver location 1120, to the area of low illumination 105 and back to surface locations 1115.

Figure 12:
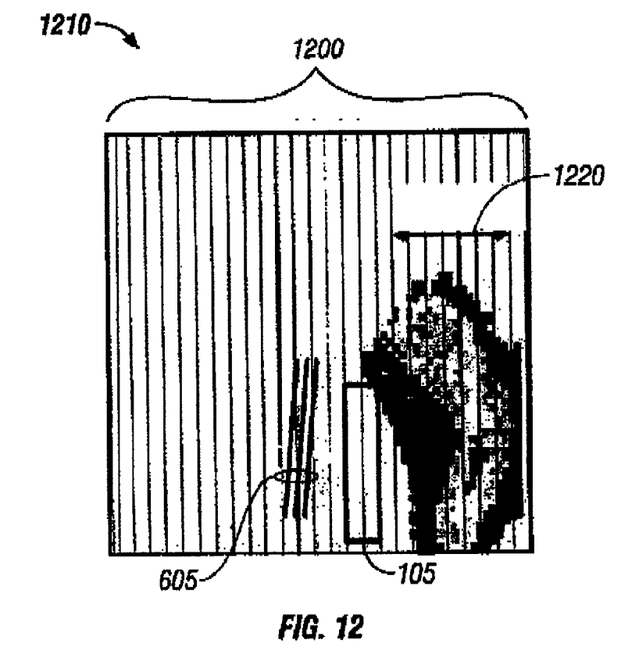
FIG. 12 illustrates the concentration of emergent source points of reverse ray tracing for receivers located within a first surface area.

For receiver location area 605, FIG. 12 illustrates the concentration of departure points identified in the reverse ray tracing process illustrated in FIG. 11. The lighter areas within surface area 1210 are the areas of greater concentration of such departure points. Consequently a targeted survey may be performed more efficiently without sacrificing survey quality by concentrating the source locations in these areas of greater concentration of departure points. Similarly, FIG. 13 illustrates the concentration of departure source points of this reverse ray tracing for receivers located within area 610.

Figure 13:
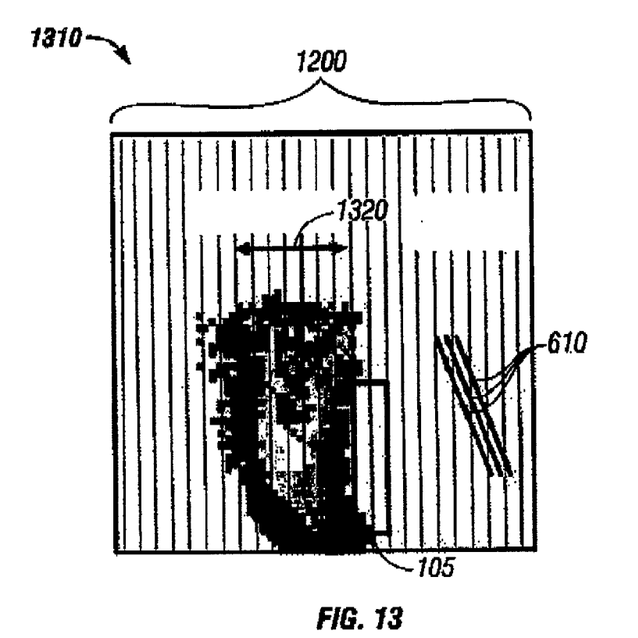
FIG. 13 illustrates the concentration of emergent source points of reverse ray tracing for receivers located within a second surface area.

FIGS. 12 and 13 illustrate a targeted survey conducted according to this embodiment of the invention. In FIG. 12, possible travel paths for the seismic survey vessel pulling the seismic sources are indicated by the parallel lines denoted with numeral 1200. However, signals may be generated at the surface areas of high departure fold by generating signals only along the travel paths indicated by numeral 1220. Similarly, in FIG. 13, signals may be generated at the surface areas of high departure fold by generating signals only along the travel paths indicated by numeral 1320. In this implementation of the invention, ocean bottom cables are positioned in the previously identified positions for optimal positioning of receivers, and a seismic survey vessel pulls the sources along streamer lines that cross the areas identified as optimal positions for sources.

In another aspect, the invention features a computer program for performing a targeted geophysical survey. The computer program is stored on a tangible storage medium. The program includes executable instructions that cause a computer to generate a simulation of a seismic survey having sources and receivers positioned in selected locations with respect to a subsurface earth model; perform ray tracing from the sources, to estimate propagation ray paths of seismic signals emanating from said source locations; determine locations of emergent points at which such ray paths reach the earth's surface following reflection from a subsurface area of interest are concentrated. The program may include further executable instructions that cause the computer to performing ray tracing from said locations in which emergent points are concentrated to determine locations of sources from which such raypaths emanate.

Although the system described herein is described primarily with respect to a marine survey in which ocean bottom cables are utilized for performing the targeted survey, the system may be implemented on land or in marine environments, and may utilize towed streamers, ocean bottom cables, land cables, wired telemetry seismic receiver stations, radio telemetry seismic receiver stations, stored data seismic receiver stations, or other source and receiver apparatus and methods known to the industry.

While the invention has been described with respect to a limited number of embodiments, those skilled in the art, having benefit of this disclosure, will appreciate that embodiments can be devised which do not depart from the scope of the invention as disclosed herein. Accordingly, the scope of the invention should be limited only by the attached claims.

What is claimed is:

1. A method for planning a seismic survey based on a model of a subsurface formation, comprising:
   generating a computer simulation of a seismic survey having sources and receivers positioned in selected locations with respect to said model;
   determining an area in at least one subsurface reflective target having low illumination from the computer simulation;
   performing ray tracing from said source locations to estimate propagation ray paths of seismic signals emanating from said source locations;
   determining locations of emergent points at which ray paths reach the earth's surface following reflection from at least the area of low illumination are concentrated;
   performing ray tracing from said locations in which emergent points are concentrated to determine source locations where ray paths reaching the earth's surface following reflection from at least the area of low illumination are concentrated; and
   designing the seismic survey such that receiver locations are concentrated at said locations where said emergent points are concentrated and source positions are concentrated at said source locations where said ray paths are concentrated.

2. The method of claim 1 further comprising performing a seismic survey according to said design.

3. The method of claim 1 wherein said model is based at least in part on a seismic survey.

4. The method of claim 1 wherein said model is based at least in part on well log data.

5. The method of claim 1 wherein said model is based at least in part on gravity data.

6. The method of claim 1 wherein said model is based at least in part on magnetic data.

* * * * *